United States Patent
Pellon et al.

(10) Patent No.: US 6,642,832 B2
(45) Date of Patent: Nov. 4, 2003

(54) ARC RESPONSIVE THERMAL CIRCUIT BREAKER

(75) Inventors: Christian V. Pellon, Norton, MA (US); Peter G. Berg, Attleboro Falls, MA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/045,234

(22) Filed: Oct. 29, 2001

(65) Prior Publication Data

US 2002/0080003 A1 Jun. 27, 2002

Related U.S. Application Data

(60) Provisional application No. 60/254,350, filed on Dec. 8, 2000.

(51) Int. Cl.[7] .................. H01H 37/52; H01H 37/70; H02H 3/08
(52) U.S. Cl. .................. 337/66; 337/55; 337/56; 337/72; 337/90; 361/42; 361/93.1; 361/139
(58) Field of Search .................. 337/1–3, 12, 13, 337/35, 36, 37, 38, 55, 56, 66, 70–73, 75, 76, 90, 91; 361/1, 31, 32, 42, 62, 63, 78, 93.1, 102, 103, 105, 139

(56) References Cited

U.S. PATENT DOCUMENTS

| | | | |
|---|---|---|---|
| 3,361,882 A | 1/1968 | Clarke | |
| 4,400,677 A | 8/1983 | Cobb, III et al. | |
| 4,473,859 A | * 9/1984 | Stone et al. | 361/99 |
| 4,939,495 A | 7/1990 | Peterson et al. | |
| 5,223,795 A | * 6/1993 | Blades | 324/536 |
| 5,477,150 A | 12/1995 | Ham, Jr. et al. | |
| 5,519,561 A | * 5/1996 | Mrenna et al. | 361/105 |
| 5,536,980 A | 7/1996 | Kawate et al. | |
| 5,940,256 A | * 8/1999 | MacKenzie et al. | 361/42 |
| 5,986,860 A | * 11/1999 | Scott | 361/42 |
| 6,339,525 B1 | * 1/2002 | Neiger et al. | 361/42 |
| 2002/0149462 A1 | * 10/2002 | Habedank et al. | 337/13 |

FOREIGN PATENT DOCUMENTS

JP 08067963 A * 3/1996 ............. C23C/8/36

* cited by examiner

Primary Examiner—Anatoly Vortman
(74) Attorney, Agent, or Firm—Russell E. Baumann; Frederick J. Telecky, Jr.

(57) ABSTRACT

A circuit breaker (10) has a current carrying bimetallic element (18) which bends upon self-heating and upon being subjected to a selected overload current transfers motion to a connecting plate (32) which displaces a latch surface (42b) from a catch (34a) of a bell crank mechanism (34) allowing a spring biased operating member (28) to move movable contact means (12) out of contact engagement with stationary contact means (14) thereby tripping the circuit breaker. An arc sensing circuit (52) is coupled to the load circuit and upon sensing selected arcs causes an arc responsive actuator (56, 62) to be energized to transfer motion to the latch (42) to trip the circuit breaker.

4 Claims, 2 Drawing Sheets

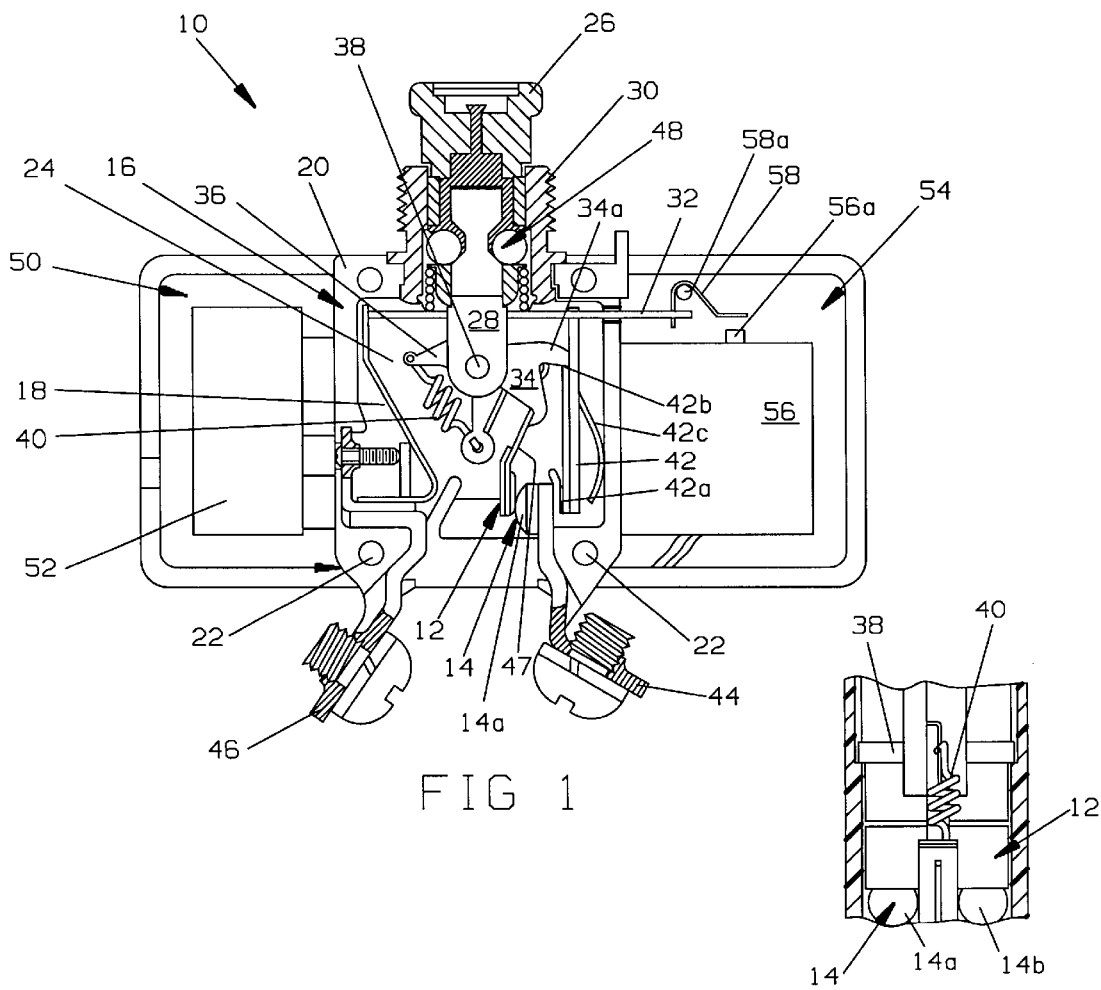
FIG 1
FIG 1a
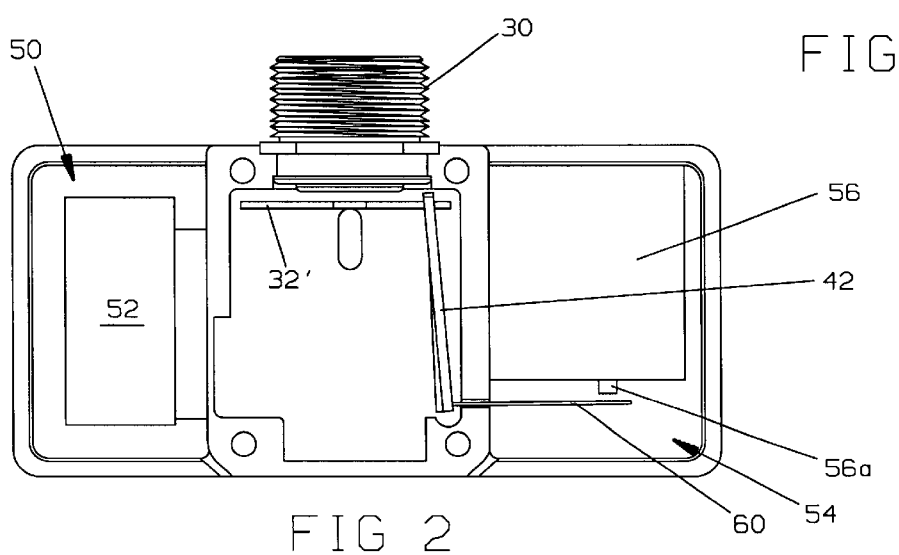
FIG 2

ARC RESPONSIVE THERMAL CIRCUIT BREAKER

This application claims priority under 35 USC Section 119 (e) (1) of provisional application No. 60/254,350 filed Dec. 8, 2000.

FIELD OF THE INVENTION

This invention relates generally to electrical circuit breakers and more particularly to aircraft circuit breakers for interrupting electrical circuits on the occurrence of arcing conditions as well as current overload conditions in the circuits.

BACKGROUND OF THE INVENTION

Thermally responsive electrical circuit breakers typically interrupt electrical circuits in response to the occurrence of selected overload conditions in the circuits to protect other equipment and wiring in the circuits from damage due to overheating, overcurrent or the like. Examples of such devices are shown in U.S. Pat. Nos. 3,361,882 and 4,400,677, the disclosures of which are incorporated herein by this reference. In these patents a control mechanism manually moves movable contacts into and out of engagement with complementary stationary contacts to open and close a circuit and a thermally responsive bimetallic member is operable to open the circuit in response to the occurrence of a selected overload current in the circuit. The bimetallic member is formed of metal materials having substantial electrical resistance properties and the member is disposed in the circuit breaker so that the member is self-heated and flexes to a selected extent to trip the mechanism to open the circuit breaker when selected overload current flows in the circuit for a selected period of time. The circuit breaker is adapted to be latched in the open circuit position until manually reset after it has been manually opened or has been opened in response to the occurrence of an overload current. It is also "trip free" in that the circuit breaker will open in response to the occurrence of an overload current even if the manual resetting means is manually held in the circuit closing position.

Circuit breakers of this type are not designed to respond to low current events; however, there are certain low current events, viz, arcs, which are capable of causing fires or catastrophic events. For example, an electrical connection that is starting to become loose can result in sufficient energy to cause arcing yet have insufficient current drawn through the circuit to actuate the circuit breaker. Although household circuit breakers containing arc sensing technology are known, these devices are limited in their capabilities and are far too large to use in aircraft.

SUMMARY OF THE INVENTION

An object of the present invention is to provide an arc fault protection circuit breaker amenable to aircraft usage. Another object of the invention is the provision of a conventional aircraft circuit breaker which trips open upon sensing an overload current condition which is adapted to also provide protection from arcing conditions. Another object of the invention is to provide a circuit breaker which will open a circuit upon the occurrence of an arc fault as well as a thermal overcurrent condition and which provides trip indication to distinguish between a trip caused by an arc fault condition and one caused by a thermal or overcurrent condition.

Briefly stated, a circuit breaker made in accordance with the invention comprises movable contact means, complimentary stationary contact means and a control mechanism for normally holding the movable contact means in engagement with the stationary contact means in a closed circuit position. As in the above referenced patents, the control mechanism includes a thermally responsive bimetallic member having substantial electrical resistance properties which is disposed in the breaker circuit so that an overload current flowing in the circuit for a selected period of time self-heats the bimetallic member causing it to bend and move a motion transfer connecting plate and concomitantly a latch to unlatch a member from a spring biased bell crank mechanism allowing the bell crank mechanism to rotate and thereby move the contacts to the open circuit position in a conventional manner. According to the invention, an arc sensing circuit is included in the circuit breaker and is electrically connected to a supplemental actuator for unlatching the bell crank mechanism to move the contacts to the open circuit position. In one preferred embodiment, the actuator includes a solenoid which, when energized by the arc sensing circuit, transfers motion to a lever mounted in a position to be pushed by the solenoid upon energization thereof with the lever coupled to an extension of the connecting plate for pulling the connector plate along with the latch to unlatch the bell crank mechanism. In another preferred embodiment in which the actuator includes a solenoid, an arm is attached to the latch causing the latch to pivot and unlatch the bell crank mechanism. In still another preferred embodiment, an elongated piezoresistive member is coupled to the connecting plate and is electrically energizable upon energization of the arc sensing circuit. Upon energization, the piezoresistive member bends to pull the connecting plate along with the latch to unlatch the bell crank mechanism as in the previously described embodiment. According to a feature of the invention, a suitable indicating means, such as a visual indicator, may be provided which is energized when the arc sensing circuit causes the circuit breaker to trip to distinguish the trip from one caused by a current overload. In an alternative preferred embodiment, a mechanical relay having a coil is included in the circuit breaker in which the coil is energized upon the occurrence of an overload current causing the relay to open. Upon opening of the relay, the current is temporarily shunted through a transistor to eliminate arcing of the mechanical contacts. Once the mechanical contacts have opened sufficiently far to avoid arcing, the transistor is then de-energized along with load current.

BRIEF DESCRIPTION OF THE DRAWINGS

Other objects, advantages and details of the novel and improved circuit breaker of the invention appear in the following detailed description of the preferred embodiment of the invention, the detailed description referring to the drawings in which:

FIG. 1 is an elevational view, partly in cross section, of a circuit breaker, with one casing half removed, made in accordance with a first preferred embodiment of the invention;

FIG. 1a is a broken away cross sectional view of a portion of the housing showing the lower portion of the operating member and a portion of the contact assemblies;

FIG. 2 is similar to FIG. 1 but shown with circuit breaker components removed for ease of illustration and showing a second preferred embodiment of the invention.

DETAILED DESCRIPTION OF PREFERRED EMBODIMENTS

Figure 3:
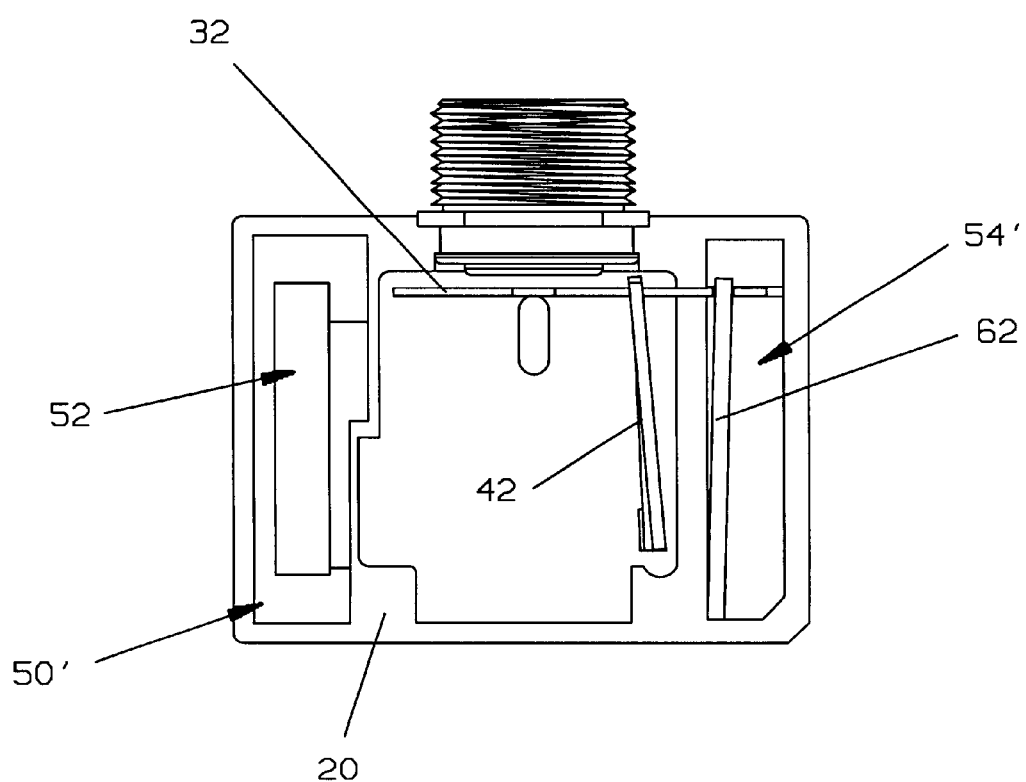
FIG. 3 is similar to FIG. 2 showing a third preferred embodiment of the invention.

Referring to FIG. 1, numeral 10 indicates a thermally responsive circuit breaker similar to that shown in U.S. Pat.

Nos. 3,361,882 and 4,400,677 referenced supra, modified to include arc sensing circuitry and tripping apparatus. Breaker 10 includes movable contact means 12, complimentary stationary contact means 14 and a control mechanism 16 which includes thermally responsive bimetallic means 18. The control mechanism normally holds the movable contact means 12 in engagement with the complimentary stationary contact means 14 to close the breaker circuit. However, the thermally responsive bimetallic element 18 has substantial electrical resistance properties and is disposed in the breaker circuit where it is adapted to be self-heated and to bend in a selected direction, i.e., to the right as seen in FIG. 1, due to the flow of current through the bimetallic element. During an overcurrent condition, the bimetallic element is heated enough to push a connecting plate 32 which in turn trips the control mechanism 16 to move the movable contact means out of engagement with the complimentary stationary contact means to open the circuit breaker in a conventional manner. Control mechanism 16 is also adapted to manually move the movable contacts into and out of engagement with the complimentary stationary contacts, to releasably latch the movable contact means to the open circuit position when they are moved to that position either manually or in response to the occurrence of an overload current, to permit the circuit breaker to be manually reset after manual opening or after normal opening in response to overload current if the bimetallic element has cooled, and to be compensated for variations in ambient temperature in its normal thermal response to the occurrence of an overload current in the breaker circuit.

As described above, circuit breaker 10 substantially corresponds to the circuit breaker described in the above referenced patents. That is, the circuit breaker includes a pair of mating casing halves 20, one being shown in FIG. 1, which are secured together by rivets (not shown) extending through casing apertures 22 to form an enclosure or chamber 24 therebetween, the casing halves having grooves and abutments therein for locating the various breaker components in the chamber as will be understood. A push-pull button 26 and an operating member 28 are mounted in a threaded bushing 30 which is held between the casing halves, the bushing's threads serving to mount the breaker on a control panel or the like so that the pushbutton is accessible on the panel. Operating member 28 extends into chamber 24 and through an aperture in a motion transfer connecting plate 32 so that bell crank 34 is rotatable in a bifurcated end of operating member 28 on a shaft 38. A spring 40 extending from anchor plate 36 to the bell crank biases the bell crank to rotate in a clockwise direction as viewed in FIG. 1 and a latch 42 pivotable in slot 42a in the casing halves has a latch end 42b normally engaged with a catch 34a on the bell crank. The complimentary stationary contact means 14 comprises a first stationary contact 14a connected to one terminal 44 and a second contact 14b which is electrically connected to terminal 46 through bimetallic element 18. The movable contact means 12 are mounted on bell crank 34 by spring 47 and are adapted to be moved into and out of resilient, bridging engagement with the two complimentary stationary contacts for closing and opening the breaker circuit. The motion transfer connecting plate is movable with bimetallic element 18 for moving latch 42 as the bimetallic member moves, and additional latch and spring means 48 for operating member 28 are incorporated within bushing 30.

Since the above structure is shown and described in the above referenced patents, it is not further described herein and it will be understood that, if the push-pull button 26 is manually depressed when the breaker circuit is open and when the bimetallic element is at ambient temperature, bimetallic element 18, connecting plate 32 and latch 42 are in the position shown in FIG. 1, the latch being biased by a spring part 42c to pivot to the left in casing slot 42a as viewed in the figure. Accordingly, operating member 28 moves bell crank 34 downwardly to engage catch 34a with the latch end 42b and to rotate the bell crank counterclockwise against the bias of spring 40 to engage the movable contact means 12 with the complimentary stationary contact means 14 to close the breaker circuit between terminals 44 and 46. The releasable latch and spring means 48 within bushing 30 resiliently hold the bell crank in the position shown while the breaker contacts are in the illustrated closed circuit position. In that arrangement, the breaker circuit extends from terminal 44 through contact means 12 and 14 and via bimetallic element 18 to terminal 46. Pulling on button 26 can release the latch within bushing 30 so that bell crank 34 rotates clockwise to disengage the movable contact means 12 from the stationary contact means 14 to open the breaker circuit and to move pushbutton 26 outwardly from bushing 30.

If a current overload occurs in the breaker circuit, that current flows through the thermally responsive element 18 which is formed of metal materials having substantial electrical resistance properties in the normal manner of thermally responsive bimetallic members. As a result, the member is self-heated and bends (to the right as viewed in FIG. 1) in response to such heating. The bimetallic element is proportioned in a conventional manner so that, when a selected overload current continues for a selected period of time, the bimetallic element bends sufficiently to move connecting plate 32 to unlatch end 42b from bell crank catch 34a. When that occurs, the bell crank rotates clockwise under the bias of spring 40 moving contact means 12 to the open circuit position and releasing the resilient force on the releasable latch means within bushing 30 whereby the spring means in bushing 30 moves push-pull button 26 and operating member 28 upwardly to their open circuit position. The latch end 42b is mounted on latch 42 by thermally responsive means which compensate for change in ambient temperature so that the above described opening of the breaker circuit occurs after the occurrence of the selected overload current for the selected period of time even under varying ambient temperature conditions.

In accordance with one preferred embodiment of the invention, the circuit breaker is formed with a circuit chamber 50 for receiving arc sensing circuit 52 and a supplementary actuator chamber 54 for receiving an arc responsive actuator assembly. As shown in FIG. 1, the arc responsive actuator assembly comprises a solenoid 56 having a plunger 56a adapted, when the solenoid is energized, to engage pivot arm 58 causing pivot arm 58 to pivot about pin 58a. Pivot arm 58 is attached to an extended portion of connecting plate 32 so that the pivotal motion of the pivot arm 58 caused by solenoid 56 will pull connecting plate 32 to the right as seen in FIG. 1 to thereby unlatch bell crank 36 and move contact means 12 to the open circuit position. Any suitable arc sensing circuit 52 may be employed such as that described in U.S. Pat. No. 5,477,150, the disclosure of which is incorporated herein by this reference. As noted above, loose connections and other imperfections can cause electric arcs. Such arcs generate radio frequency (RF) noise which is radiated from the arc and/or travels along the conductors of that circuit in accordance with a skin effect. RF noise generated by an electric arc or spark comprises a spectrum of a broad band of distinct instantaneous radio frequencies which can be called the "RF signature" of the arc. A sample of the RF signature of the arc is picked up by an RF energy pickup in circuit 52 with the circuit conditioning the RF signature to produce an output to apply line voltage to drive solenoid 56. Circuit 52 also is preferably powered by line voltage through appropriate connections with terminals 44 and 46.

FIG. 2 illustrates another preferred embodiment of the invention in which solenoid 56 is used. Except for latch 48 and connecting plate 32', the contact assemblies and the overload current components of the circuit breakers have not been shown for ease of illustration. In the FIG. 2 embodiment, plunger 56a of solenoid 56, when energized, is arranged to push trip lever 60 which is firmly attached to the latch assembly causing the latch assembly to pivot clockwise, at seen in FIG. 2, thereby tripping the breaker.

FIG. 3 illustrates another preferred embodiment in which a piezoresistive element serves as the arc responsive actuator rather than a solenoid in the previously described embodiments. Elongated element 62 is formed of piezoresistive material and is electrically energized either directly or indirectly by the output of arc sensing circuit 52. Piezoresistive element 62 is connected to connecting plate 32 as by being received through a slot formed in the connecting plate. Upon energization of element 62, it bends to the right as seen in FIG. 3 thereby pulling connecting plate 32 along with latch 42 to trip the circuit breaker. The piezoresistive actuator takes less room than the solenoid 56 allowing a smaller chamber 54'. If desired, the piezoresistive actuator could be used to move a trip lever as in the FIG. 1 embodiment.

In all the embodiments described above, the arc sensing circuitry and actuator are mounted in a thermal, overload current circuit breaker taking advantage of the existing control mechanism and movable contact structure which are well established in the industry.

It should be understood that although particular embodiments of the invention have been described by way of illustrating the invention, this invention includes all modifications and equivalents of the disclosed embodiments falling within the scope of the appended claims. For example, a visual indication switch can be provided which would be energized at the time the arc responsive actuator is energized to provide an indication that the circuit breaker has tripped due to the detection of arcs. Further, the circuit breaker could be provided with a mechanism to cause the breaker to latch open upon tripping due to an arc fault to prevent resetting without special means. In another modification the arc sensing circuit can also be used to sense current level and upon detection of a selected peak current level or higher, send a signal to the arc responsive actuator to open the device. Since the actuator can respond much more rapidly to a rupture level fault than the bimetallic element can, this enhancement would speed up the device response to rupture level currents thereby increasing its durability by limiting the length of time the breaker would be carrying the high currents. Another modification could be the addition of a feature to eliminate the destructive arcing induced by contacts making and breaking. In this modification the bimetallic element carrying the load current would close a set of contacts upon the occurrence of an overload. The closing of the contacts would energize the coil of a mechanical relay placed in series with the load current causing the relay to open. Upon opening of the relay, the current would be temporarily shunted through a solid state transistor eliminating arcing of the mechanical contacts. Once the mechanical contacts opened sufficiently in order to avoid arcing, the transistor would then be de-energized and all load current would cease to flow. Among the advantages are that the bimetal element provides thermal memory for achieving a desirable time/current trip curve. Further details of the similar arrangement is shown in U.S. Pat. No. 5,536,980, assigned to the assignee of the present invention.

What is claimed:

1. A circuit breaker comprising an electrically insulative housing, a stationary electrical contact mounted in the housing, a movable electrical contact mounted in the housing movable into and out of engagement with the stationary contact, a latch having a movably mounted latching surface, a contact opening mechanism connected to the movable contact and having a catch received on the latching surface, a spring biasing the contact opening mechanism toward a contact opening position with the engagement of the catch on the latch preventing such movement, a bimetallic element connected to the stationary contact to conduct current when the movable contact is in engagement with the stationary contact, the bimetallic element bending in a selected direction upon self-heating due to the conduction of current therethrough, a movable connecting plate extending from the bimetallic element to the latch, the bimetallic element bending sufficiently upon a current overload to move the connecting plate to in turn relatively move the latch from the catch to thereby trip the circuit breaker by allowing the contact opening mechanism to move the movable contact out of contact engagement with the stationary contact, an arc sensing circuit and an arc responsive actuator comprising a a solenoid mounted in the circuit breaker, the solenoid having a movable plunger and further comprising a pivotable trip lever having two opposite ends, one opposite end disposed adjacent to and in alignment with the plunger and the other opposite end of the trip lever connected to the connecting plate so that energizing of the solenoid will cause the plunger to transfer motion to the said one end of the trip lever causing it to pivot and in turn moving the connecting plate to trip the circuit breaker, the arc sensing circuit, upon sensing an arc in the circuit connected to the stationary and movable electrical contacts, causing the solenoid to be energized to move the latch relative to the catch and trip the circuit breaker.

2. A circuit breaker comprising an electrically insulative housing, a stationary electrical contact mounted in the housing, a movable electrical contact mounted in the housing movable into and out of engagement with the stationary contact, a latch having a movably mounted latching surface, a contact opening mechanism connected to the movable contact and having a catch received on the latching surface, a spring biasing the contact opening mechanism toward a contact opening position with the engagement of the catch on the latch preventing such movement, a bimetallic element connected to the stationary contact to conduct current when the movable contact is in engagement with the stationary contact, the bimetallic element bending in a selected direction upon self-heating due to the conduction of current therethrough, a movable connecting plate extending from the bimetallic element to the latch, the bimetallic element bending sufficiently upon a current overload to move the connecting plate to in turn relatively move the latch from the catch to thereby trip the circuit breaker by allowing the contact opening mechanism to move the movable contact out of contact engagement with the stationary contact, an arc sensing circuit and an arc responsive actuator comprising a a solenoid mounted in the circuit breaker, the solenoid having a movable plunger and further comprising a trip lever fixedly attached to the latch and having an end adjacent to and in alignment with the plunger so that energization of the solenoid will cause the plunger to transfer motion to the said end of the trip lever causing the latch to move to trip the circuit breaker, the arc sensing circuit, upon sensing an arc in the circuit connected to the stationary and movable electrical contacts, causing the solenoid to be energized to move the latch relative to the catch and trip the circuit breaker.

3. A circuit breaker comprising an electrically insulative housing, a stationary electrical contact mounted in the housing, a movable electrical contact mounted in the housing movable into and out of engagement with the stationary contact, a latch having a movably mounted latching surface, a contact opening mechanism connected to the movable contact and having a catch received on the latching surface, a spring biasing the contact opening mechanism toward a contact opening position with the engagement of the catch on the latch preventing such movement, a bimetallic element connected to the stationary contact to conduct current when the movable contact is in engagement with the stationary contact, the bimetallic element bending in a selected direction upon self-heating due to the conduction of current therethrough, a movable connecting plate extending from the bimetallic element to the latch, the bimetallic element bending sufficiently upon a current overload to move the connecting plate to in turn relatively move the latch from the catch to thereby trip the circuit breaker by allowing the contact opening mechanism to move the movable contact out of contact engagement with the stationary contact, an arc sensing circuit and an arc responsive actuator comprising a piezoresistive element mounted in the circuit breaker the piezoresistive element being elongated having an end connected to the connecting plate so that energization of the piezoresistive element will cause the said end of the piezoresistive element to bend transferring motion to the connecting plate to trip the circuit breaker, the arc sensing circuit, upon sensing an arc in the circuit connected to the stationary and movable electrical contacts, causing the piezoresistive element to be energized to move the latch relative to the catch and trip the circuit breaker.

4. A circuit breaker comprising an electrically insulative housing, a stationary electrical contact mounted in the housing, a movable electrical contact mounted in the housing movable into and out of engagement with the stationary contact, a latch having a movably mounted latching surface, a contact opening mechanism connected to the movable contact and having a catch received on the latching surface, a spring biasing the contact opening mechanism toward a contact opening position with the engagement of the catch on the latch preventing such movement, a bimetallic element connected to the stationary contact to conduct current when the movable contact is in engagement with the stationary contact, the bimetallic element bending in a selected direction upon self-heating due to the conduction of current therethrough, a movable connecting plate extending from the bimetallic element to the latch, the bimetallic element bending sufficiently upon a current overload to move the connecting plate to in turn relatively move the latch from the catch to thereby trip the circuit breaker by allowing the contact opening mechanism to move the movable contact out of contact engagement with the stationary contact, an arc sensing circuit and an arc responsive actuator comprising a piezoresistive element mounted in the circuit breaker the piezoresistive element being elongated having a free end and further comprising a trip lever fixedly attached to the latch, the free end of the piezoresistive element coupled to the trip lever so that energization of the piezoresistive element will cause the free end of the piezoresistive element to bend transferring motion to the trip lever to the trip the circuit breaker, the arc sensing circuit, upon sensing an arc in the circuit connected to the stationary and movable electrical contacts, causing the piezoresistive element to be energized to move the latch relative to the catch and trip the circuit breaker.

* * * * *